United States Patent
Suzuki et al.

[19]

[11] Patent Number: 5,921,851
[45] Date of Patent: Jul. 13, 1999

[54] SPHERE POLISHER

[75] Inventors: Tomita Suzuki; Katsuhisa Tonooka; Kunio Kawashima; Chuichi Sato; Masami Shinomoto; Hiroyuki Nojima, all of Kanagawa, Japan

[73] Assignee: NSK Ltd., Tokyo, Japan

[21] Appl. No.: 08/835,477

[22] Filed: Apr. 8, 1997

[30] Foreign Application Priority Data

| Apr. 8, 1996 | [JP] | Japan | 8-110595 |
| Jun. 18, 1996 | [JP] | Japan | 8-177278 |
| Jul. 11, 1996 | [JP] | Japan | 8-199566 |
| Jul. 11, 1996 | [JP] | Japan | 8-199567 |

[51] Int. Cl.[6] ..................................................... B24B 7/17
[52] U.S. Cl. .......................... 451/267; 451/337; 451/50; 451/339
[58] Field of Search ............................. 451/49, 50, 262, 451/267, 331, 336, 337, 339

[56] References Cited

U.S. PATENT DOCUMENTS

| 3,250,042 | 5/1966 | Messerschmidt | 451/267 |
| 5,301,470 | 4/1994 | Sato | 451/50 X |
| 5,353,550 | 10/1994 | Iwai et al. | 451/124 |
| 5,520,573 | 5/1996 | Sumita et al. | 451/50 X |

FOREIGN PATENT DOCUMENTS

| 2219579 | 10/1973 | Germany | 451/50 |
| 61-270071 | 11/1986 | Japan | 451/50 |
| 5-77150 | 3/1993 | Japan | 451/50 |
| 5-253823 | 10/1993 | Japan | 451/50 |

*Primary Examiner*—Timothy V. Eley
*Attorney, Agent, or Firm*—Sughrue, Mion, Zinn, Macpeak & Seas, PLLC

[57] ABSTRACT

A sphere polisher capable of making uniform conditions under which balls are polished is provided. The inner and outer polishing circuits are defined by the grooves 23 provided on the rotative disc 10 and the fixed disc 20. The storage conveyor 50 is provided with an outer ball guiding passage 55 and an inner ball guiding passage 56. The ball supply chute 57 is provided with the inner chute portion 57*a* connecting the inner polishing circuits with the outer ball guiding passage 55, and the outer chute portion 57*b* connecting the outer polishing circuits with the inner ball guiding passage 56. The ball discharge chute 58 is provided with the inner discharge chute portion 58*a* connecting the inner polishing circuits with the inner ball guiding passage 56, and the outer discharge chute portion 58*b* connecting the outer polishing circuits with the outer ball guiding passage 57.

8 Claims, 6 Drawing Sheets

SPHERE POLISHER

BACKGROUND OF THE INVENTION

The present invention relates to a sphere polisher, and more particularly to a polisher for polishing steel balls for use in a ball bearing.

Figure 1:
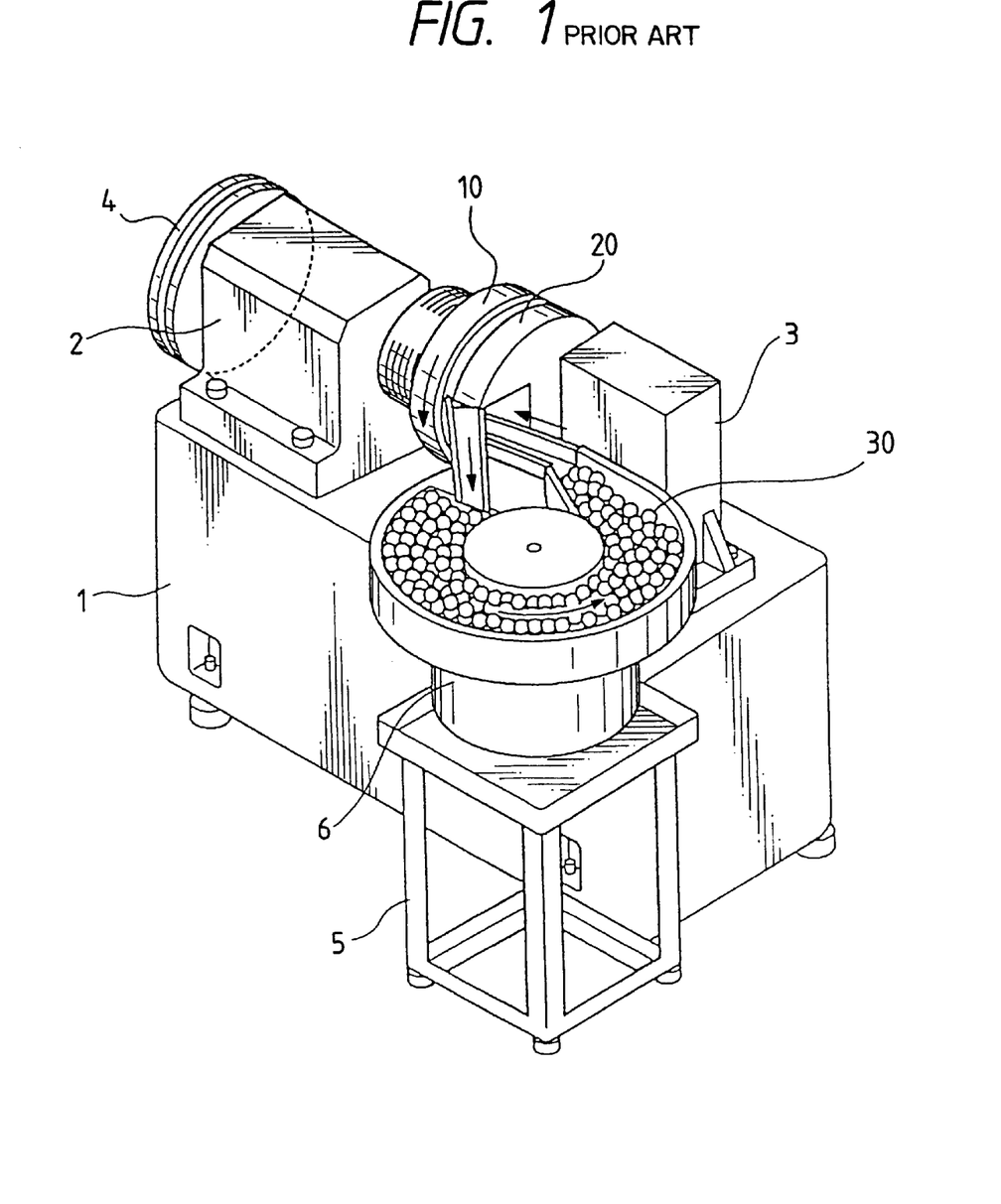
FIG. 1 is a perspective view showing a conventional steel-ball polisher.
Figure 2:
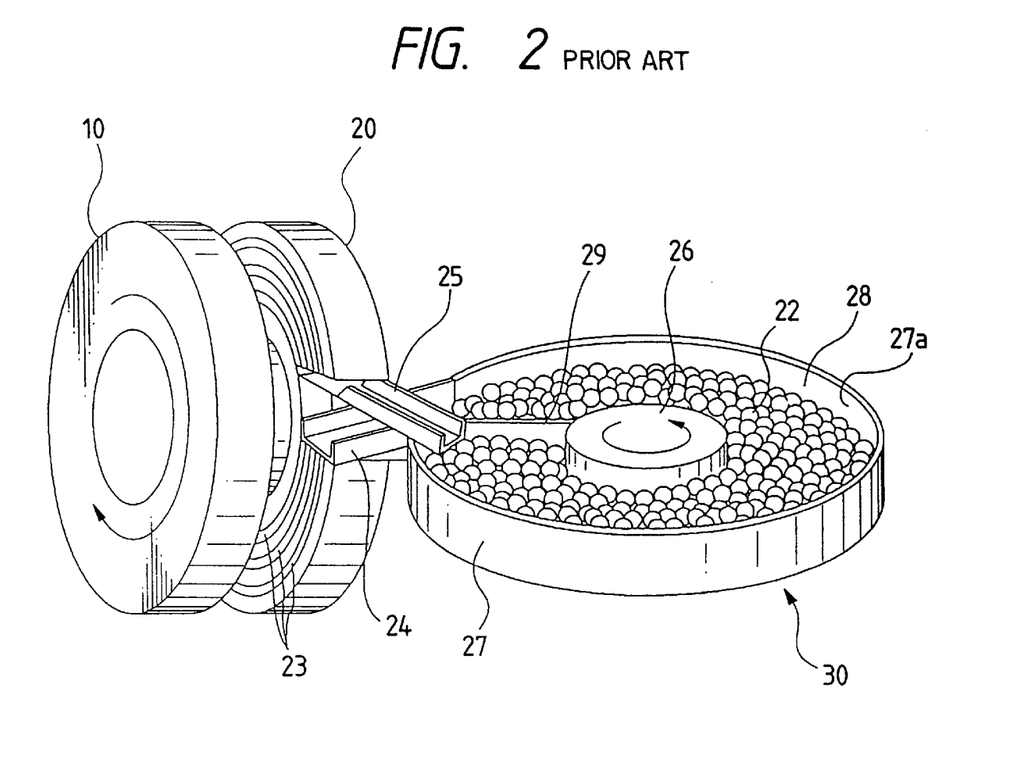
FIG. 2 is a perspective view showing an essential portion of the steel-ball polisher shown in FIG. 1.

Hitherto, an apparatus structured as shown in FIGS. 1 and 2 has been known as the above-mentioned polisher. FIG. 1 is a perspective view showing a conventional steel-ball polisher, and FIG. 2 is a perspective view showing an essential portion of the steel-ball polisher shown in FIG. 1.

The steel-ball polisher shown in FIG. 1 has a bed 1 having an end to which a support portion 2 is fixed with bolts. The bed 1 has another end to which a support portion 3 is secured with bolts. The support portion 2 rotatively supports a drive shaft (not shown). A rotative disc 10 made of a grind stone or steel for polishing steel balls is attached to an end of the drive shaft. Note that in the case where the rotative disc 10 is made of steel, a grinding solvent containing a floating abrasive is utilized when the polishing operation is being conducted.

A drive shaft pulley 4 is attached to another end of the drive shaft. The bed 1 includes a drive motor (not shown) so that the rotative disc 10 is rotated by the drive motor through the drive shaft pulley 4.

The support portion 3 movably supports a shaft (not shown) extending coaxially with the drive shaft supported by the support portion 2. The coaxial shaft has an end which faces the support portion 2 and to which a fixed disc 20 is attached. The fixed disc 20 is, by an arbitrary mechanism disposed in the support portion 3, pressed against the rotative disc 10. However, another mechanism is also applicable in which the rotative disc 10 is moved in the axial direction instead of the fixed disc 20 in such a manner that the rotative disc 10 is pressed towards the fixed disc 20.

Thus, the operation for polishing the steel balls by the rotative disc 10 and the fixed disc 20 is adjusted to, for example, three steps consisting of rough machining, medium machining and finishing. On the other hand, a frame 5 is disposed adjacent to another end of the bed 1, the frame 5 having a top surface on which a rotative conveyor 30 is disposed through a pedestal 6.

Referring to FIG. 2, the rotative disc 10, the fixed disc 20 and the rotative conveyor 30 which are essential portions of the steel ball polisher shown in FIG. 1 will now be described.

Referring to FIG. 2, each of the rotative disc 10 which is rotated and the fixed disc 20 disposed coaxially with the rotative disc 10 and arranged to be fixed has a plurality of coaxial annular grooves (concave grooves and complementary grooves) 23 each having a circular arc cross sectional shape, the size of which approximates the curvature radius of the steel balls 22. The annular grooves 23 of the rotative disc 10 and the annular grooves 23 of the fixed disc 20 are formed opposite to each other so that a pair of opposite annular grooves 23 form one polishing circuit for polishing the steel balls 22. The rotative conveyor 30 accommodates the steel balls 22 by a number which is polished at a time and which is administrated as one lot. Between the fixed disc 20 and the rotative conveyor 30, there are disposed a supply chute 24 for supplying the steel balls 22 in the rotative conveyor 30 to the polishing circuit and a discharge chute 25 for discharging, to the rotative conveyor 30, the steel balls 22 polished in the polishing circuit.

The rotative conveyor 30 is formed into a tray like shape having an annular bottom 26a (see FIG. 3) having, in the central portion thereof, a rotation center 26, and an outer frame 27 disposed in the outer periphery of the annular bottom 26a and formed individually from the bottom 26a. A plate-like stopper 29 is secured to the outer frame 27 at a position between the supply chute 24 and the discharge chute 25. Moreover, a steel-ball guide passage 28 is formed by the rotation center 26 and the outer frame 27. The annular bottom 26a of the rotative conveyor 30 is, by an arbitrary rotating mechanism disposed in the pedestal 6, rotated counterclockwise when viewed from a position above the rotative conveyor 30 so as to convey the steel balls 22 accommodated in the rotative conveyor 30 from a position corresponding to the discharge chute 25 of the steel-ball guide passage 28 to a position corresponding to the supply chute 24. Note that the steel balls 22 accommodated in the rotative conveyor 30 are stacked to form a plurality of steps in the rotative conveyor 30.

The operation of the conventional steel-ball polisher having the foregoing structure will now be described.

When the rotative conveyor 30 is operated, the steel balls 22 in the rotative conveyor 30 are allowed to pass through the supply chute 24 so as to be conveyed to the polishing circuit formed by the annular grooves 23 of the rotative disc 10 and the fixed disc 20 forming pairs. The steel balls 22 conveyed to the polishing circuit are, as described above, polished in the polishing circuit by rotating the rotative disc 10 while pressing the fixed disc 20 against the rotative disc 10. The polished steel balls 22 are returned to the rotative conveyor 30 through the common discharge chute 25. The above-mentioned operation is repeated plural times so that the polishing operation is completed.

A ball bearing for use in a HDD (Hard Disk Drive) unit or the like which has been employed as equipment for a computer in recent years must satisfy a severe accuracy in a so-called asynchronous vibration component (Non Repeated Run Out). The non repeated run out is a vibration component which is generated asynchronously with the rotation of the ball bearing. A specific non repeated run out can be reduced by reducing the mutual size differences among the steel balls 22 which are dispersion of the sizes of the steel balls.

However, the conventional steel-ball polisher cannot reduce the mutual size differences (a so called "Lot Diameter Variation" defined by ISO (International Standard Organization) among the steel balls 22 in one lot because of the following reasons.

That is, the steel balls 22 polished in the polishing circuit between the rotative disc 10 and the fixed disc 20 are moved through the common discharge chute 25, the rotative conveyor 30 and the supply chute 24 regardless of the polishing circuit among the plural polishing circuits. Therefore, a random polishing circuit is selected when the steel balls 22 are again introduced into the polishing circuit.

However, the polishing circuits between the rotative disc 10 and the fixed disc 20 have different polishing conditions between the outer polishing circuits and the inner polishing circuits in the direction of the radius of the rotative disc 10 and the fixed disc 20 because of the differences in the polishing distance, the peripheral velocity, the amount of the applied polishing solution, the number of flowing steel balls and the like.

Therefore, if the steel balls 22 are allowed to randomly pass through the concentric polishing circuits having different polishing conditions between the inner polishing circuits and the outer polishing circuits in the radial direction, the diameters of the steel balls 22 are varied due to the difference in the polishing circuits through which the steel balls 22 have been allowed to pass through. Therefore, steel balls 22 even included in the same lot have different diameters.

Moreover, the steel balls 22 accommodated in the rotative conveyor 30 in a stacked state have a problem in that the flow of the steel balls 22 becomes non-uniform in the steel-ball guide passage 28 because of frictional resistance to be described later.

Figure 3:
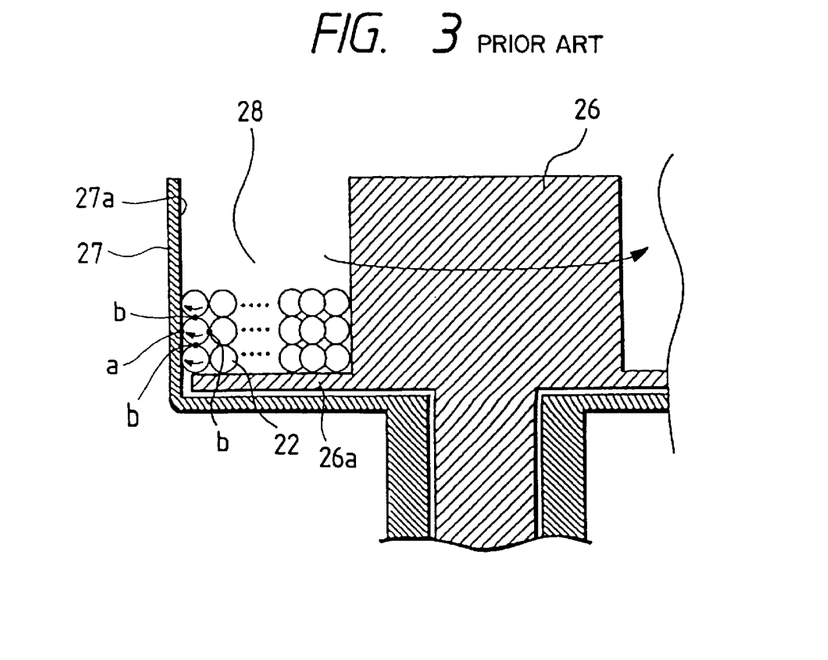
FIG. 3 is a diagram showing the frictional resistance applied to the steel balls and the operations of the steel balls in the steel-ball guide passage.

Referring to FIG. 3, the frictional resistance and the operations of the steel balls 22 in the steel-ball guide passage 28 will now be described. FIG. 3 is a diagram showing the frictional resistance applied to the steel balls 22 and the operations of the steel balls 22 in the steel-ball guide passage 28.

The outer frame 27 of the rotative conveyor 30 is formed by a metal plate or in the form in which a cushioning member, such as a rubber sheet, is applied to an inner guide surface 27a of the outer frame 27 to protect the steel balls 22 from being damaged. Therefore, a line of the steel balls 22 which are brought into contact with the inner guide surface 27a of the outer frame 27 is applied with great frictional resistance (point a shown in FIG. 3) from the inner guide surface 27a of the outer frame 27. Since the foregoing frictional resistance is considerably greater than slide resistance (point b shown in FIG. 3) with the other steel balls 22, the steel balls 22 which are brought into contact with the inner guide surface 27a of the outer frame 27 rotate. Moreover, the speed of the steel balls 22 passing through the steel-ball guide passage 28 is reduced as compared with the moving speed of the bottom 26a of the rotative conveyor 30. On the other hand, the steel balls 22 which are not brought into contact with the inner guide surface 27a of the outer frame 27 are moved at substantially the same speed as the moving speed of the annular bottom 26a of the rotative conveyor 30.

As described above, the steel balls 22, which are brought into contact with the inner guide surface 27a of the outer frame 27 are conveyed slowly as compared with the other steel balls 22. Therefore, the number of passes through the polishing circuits becomes different. Moreover, the surfaces of the steel balls 22 are damaged attributable to sliding with the other steel balls 22. Thus, the state of surface finishing of the steel balls 22 are adversely affected.

In addition, in the case where the rotation speed of the rotative conveyor 30 is increased so as to make an efficiency higher, some of the steel balls 22 possibly interrupt the flow defined by the another steel balls 22. As a result of this, some of the steel balls may not be supplied or fed into some of polishing circuits. Therefore, this approach not only makes the efficiency as a whole lower but also makes the numbers of steel balls which are being simultaneously polished lower. Further, this approach is one of causes to increase of the lot diameter variation in the same lot.

SUMMARY OF THE INVENTION

An object of the present invention is to provide a sphere polisher capable of making uniform conditions under which spheres are polished, that is, capable of making the lot diameter variation in the same lot remarkably smaller.

In order to achieve the foregoing object, according to one aspect of the present invention, there is provided a sphere polisher comprising:

a non-rotative fixed disc having a plurality of first annular grooves formed concentrically around the axis of an fixed disc and at least one opening which is formed in a side surface of the fixed disc and which extends in the radial direction of the fixed disc;

a rotative disc structured to rotate coaxially with and opposite to the fixed disc and having a plurality of second annular grooves formed concentrically with and opposite to the first annular grooves to form a plurality of polishing circuits;

sphere supply means having a first supply passage formed in the opening, connected to a group of the plural polishing circuits formed in an inner portion in the radial direction of the two discs and structured to supply sphere members required to be polished to the group formed in the inner portion in the radial direction of the two discs and a second supply passage formed in the opening, connected to a group of the plural polishing circuits formed in an outer portion in the radial direction of the two discs and structured to the sphere members required to be polished to the group formed in the outer portion in the radial direction of the two discs;

sphere discharge means having a first discharge passage formed in the opening, connected to the group of the plural polishing circuits formed in the inner portion in the radial direction of the two discs and structured to discharge the spheres members polished by the group formed in the inner portion in the radial direction of the two discs, and a second discharge passage formed in the opening, connected to the group of the plural polishing circuits formed in the outer portion in the radial direction of the two discs and structured to discharge the spheres polished by the group formed in the outer portion in the radial direction of the two discs; and a storage conveyor disposed between the sphere supply means and the sphere discharge means, having a plurality of sphere conveying and guiding passages for conveying and guiding the spheres discharged from the sphere member discharge means to the sphere supplying means.

The sphere polisher according to the present invention may have the storage conveyor comprising a circular conveyor or a straight conveyor.

The storage conveyor of the sphere polisher according to the present invention may have a structure such that the low-friction slide member may be applied to the inner guide surface of the outer frame or the inner guide surface may be coated with the low-frictional slide member.

The sphere polisher according to the present invention may have a structure such that the low-frequency slide member is formed into a segment shape.

DETAILED DESCRIPTION OF THE PREFERRED EMBODIMENTS

The basic structure of a sphere polisher according to each of embodiments of the present invention is arranged similarly to the steel-ball polisher described with reference to the FIG. 1.

That is, referring to FIG. 1, a shaft support portion 2 is, with bolts, secured to an end of the upper surface of a bed 1. A support portion 3 is secured to another end of the upper surface of the support portion 1 with bolts.

A drive shaft (not shown) is rotatively supported by the support portion 2. A rotative disc 10 made of a grind stone for polishing steel balls is attached to an end of the drive shaft facing the support portion 3. A drive-shaft pulley 4 is attached to another end of the drive shaft. A drive motor (not shown) is disposed in the bed 1 so that the rotative disc 10 is rotated by the drive motor through the drive-shaft pulley 4.

The support portion 3 movably coaxially supports a shaft (not shown) extending in the lengthwise direction with the drive shaft supported by the support portion 2. A fixed disc 20 is attached to an end of the foregoing shaft facing the support portion 2. The fixed disc 20 is pressed against the rotative disc 10 by an arbitrary mechanism disposed in the support portion 3. Thus, the polishing pressure of the rotative disc 10 and the fixed disc 20 to be applied to the steel balls can be adjusted to three steps consisting of, for example, rough polishing, intermediate polishing and finish polishing. On the other hand, a frame 5 is disposed adjacent to another end of the bed 1, the frame 5 having an upper surface on which a rotative conveyor 50 serving as a storage conveyor is disposed through a pedestal 6 in place of the rotative conveyor 30 of the sphere polisher shown in FIG. 1.

Figure 4:
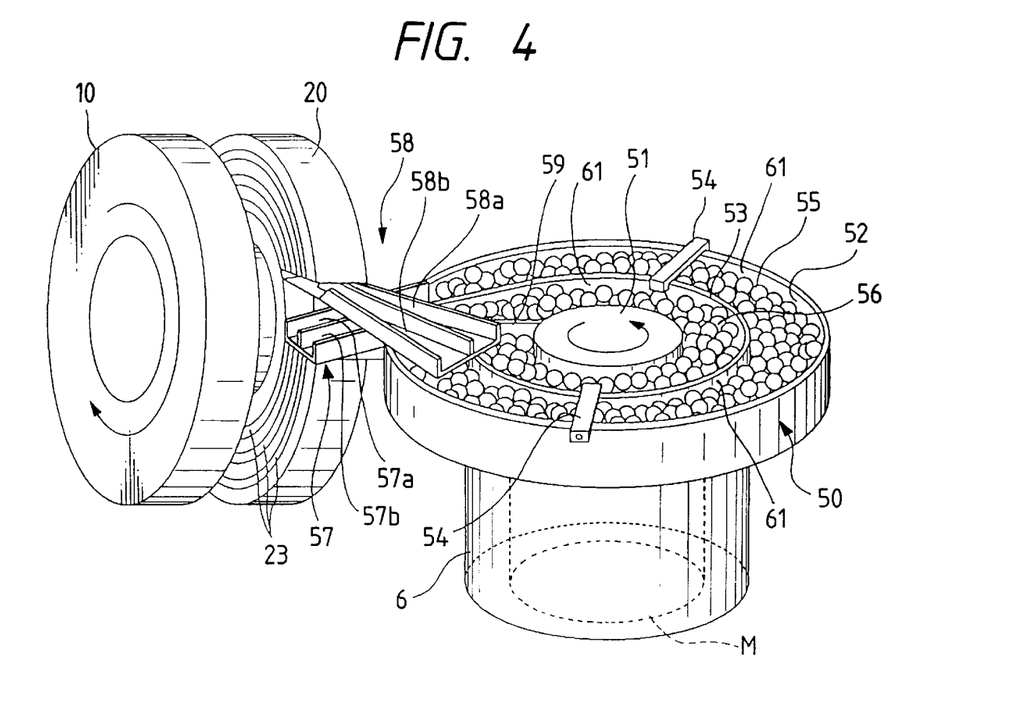
FIG. 4 is a perspective view showing an essential portion of the sphere polisher according to this embodiment of the present invention.

Referring to FIG. 4, the structure of the sphere polisher according to this embodiment of the present invention will now be described. FIG. 4 is a perspective view showing an essential portion of the sphere polisher according to this embodiment of the present invention.

The structure of the sphere polisher according to the first embodiment of the present invention is different from the conventional steel-ball polisher in that a rotative conveyor 50, a supply chute 57 and a discharge chute 58 form two systems of steel ball flow passages. The other structure is formed similarly to that of the conventional steel-ball polisher.

The rotative conveyor 50 is formed into a tray-like shape having a rotative circular bottom (not shown) provided with a rotation center 51 in the central portion thereof and a stationary outer frame 52 formed around the circular bottom individually from the circular bottom. Between the rotation center 51 and the outer frame 52, an intermediate frame 53 is formed concentrically with the outer frame 52. The intermediate frame 53 is secured to and held by a securing member 54 which is attached to the outer frame 52. The pedestal 6 of the rotative conveyor 50 includes a rotating mechanism M for rotating the rotation center 51 and the circular bottom.

A first steel-ball guide passage 55 having an annular shape and serving as a first sphere guide passage is formed between the intermediate frame 53 and the outer frame 52. A second steel-ball guide passage 56 having an annular shape and serving as a second sphere guide passage is formed between the rotation center 51 and the intermediate frame 53.

The supply chute 57, which is an example of a sphere supply means, consists of a first supply chute portion 57a connected to the first steel-ball guide passage 55 and a second supply chute portion 57b connected to the second steel-ball guide passage 56. The leading end of the first supply chute portion 57a is connected to a polishing circuit group among plural polishing circuits of the fixed disc 20 which are formed inside in the radial direction, while the leading end of the second supply chute portion 57b is connected to a polishing circuit group among the polishing circuits of the fixed disc 20 which are formed outside in the radial direction.

The discharge chute 58 serving as the sphere discharge means consists of a first discharge chute portion 58a connected to the group of the polishing circuits among the plural polishing circuits of the fixed disc 20 which are formed inside in the radial direction; and a second discharge chute portion 58b connected to the group of the polishing circuit among the plural polishing circuits of the fixed disc 20 which are formed outside in the radial direction. The leading end of the first discharge chute portion 58a is disposed above the second steel-ball guide passage 56, while the leading end of the second discharge chute portion 58b is disposed above the first steel-ball guide passage 55.

A plate-like stopper 59 is, at a position between the supply chute 57 and the discharge chute 58, secured to the outer frame 52.

The diameter of each of the steel balls to be polished is 1 mm to 3 mm. The total number of the steel balls which are circulated in the sphere polisher according to this embodiment is hundreds of thousands. Among the total number of the steel balls, 99% or more steel balls are positioned in the rotative conveyor 50.

Referring to FIG. 4, the operation of the sphere polisher according to this embodiment will now be described.

When the rotative conveyor 50 has been operated, the steel balls 22 are, through the first supply chute portion 57a, supplied from the first steel-ball guide passage 55 to the group of the polishing circuits of the plural polishing circuits which are formed inside in the radial direction. The steel balls 22 supplied to the inside polishing circuit group are polished in the polishing circuits by rotating the rotative disc 10 while pressing the fixed disc 20 against the rotative disc 10 as described above. The polished steel balls 22 are returned to the second steel-ball guide passage 56 of the rotative conveyor 50 through the first discharge chute portion 58a of the rotative conveyor 50.

Moreover, the steel balls 22 are, through the second supply chute portion 57b, supplied from the second steel-ball guide passage 56 to the group of the polishing circuits of the plural polishing circuits which are formed outside in the radial direction. The steel balls 22 supplied to the outside polishing circuit group are polished in the polishing circuits by rotating the rotative disc 10 while pressing the fixed disc 20 against the rotative disc 10 as described above. The polished steel balls 22 are returned to the first steel-ball guide passage 55 of the rotative conveyor 50 through the second discharge chute portion 58b of the rotative conveyor 50.

According to this embodiment, the steel balls 22 are allowed to alternately pass through the group of the polishing circuits among the plural polishing circuits which are formed outside in the radial direction and the group of the polishing circuits formed inside in the radial direction. Therefore, the conditions under which the steel balls 22 are polished can be uniformed.

Although this embodiment has the structure such that the polishing circuits are divided into the outer group in the radial direction and the inner group in the radial direction and the rotative conveyor 50, the supply chute 57 and the discharge chute 58 are divided into two systems of flow passages for the steel balls, the flow passage for the steel balls may be divided into three or more systems.

Although the mechanism for applying pressure to the steel balls which are being polished is provided for the fixed disc portion, it may be provided for the rotative disc. Although the rotative conveyor is employed to circulate and store the steel balls, a straight conveyor having the foregoing functions may be employed.

It is preferable that the first embodiment of the present invention has the structure such that a low-friction slide member 61 is applied to each of the inner guide surface of the outer frame 52 and the inner and outer guide surfaces of the intermediate frame 53 of the rotative conveyor 50. Moreover, it is preferable that the low-friction slide member be applied to the inner guide surface (the side portion) of each of the supply chute 57 and the discharge chute 58.

The required inner guide surface may be coated with the low-friction slide member. The inner guide surface may be made of the low-friction slide member. The low-friction slide member may be formed into a segment shape. The low-friction slide member may be fluororesin, such as PTFE (polytetrafluoroethylene), PFEP (polyhexafluoroethylene propylene) or PFA (perfluoroalkoxy).

The frictional resistance which is applied to the steel balls 22 and the operation of the steel balls 22 in the steel ball guide passage will now be described such that the steel balls 22 in the first steel-ball guide passage 55 are taken for an example.

Since the low-friction slide member 61 made of the fluororesin or the like is attached to the inner guide surface of the outer frame 52 of the rotative conveyor 50, the line of the steel balls 22 which are brought into contact with the low-friction slide member 61 is substantially free from the frictional resistance (corresponding to point a shown in FIG. 3) from the low-friction slide member 61. Since the foregoing frictional resistance is weaker than the slide resistance (corresponding to point b shown in FIG. 3) generated with other steel balls 22, the steel balls 22 which are brought into contact with the low-friction slide member 61 do not rotate. Thus, the speed of the steel balls 22 which move through the second steel-ball guide passage 56 is, similar to that of the steel balls 22 which are not brought into contact with the low-friction slide member 61, made to be the same as the moving speed of the bottom 51a of the rotative conveyor 50. Thus, the flow of the steel balls 22 in the second steel-ball guide passage 56 in the rotative conveyor 50 is made to be uniform. As a result, unintentional difference in the number of passes through the polishing circuits can be prevented. Moreover, damage of the surfaces of the steel balls 22 attributable to sliding with other steel balls 22 can be prevented. As a result, the state of the finished surfaces of the steel balls 22 cannot adversely be affected. Since the steel balls 22 are allowed to pass through the polishing circuits in relatively uniform time periods, reduction in the lot diameter variation in the same lot is realized.

Note that the low-friction slide member is applicable to the inner peripheral surface of the outer frame 27 in the device shown FIG. 2. In this case it is obvious that the small amount of reduction in the lot diameter variation in the same lot can be realized.

Figure 5:
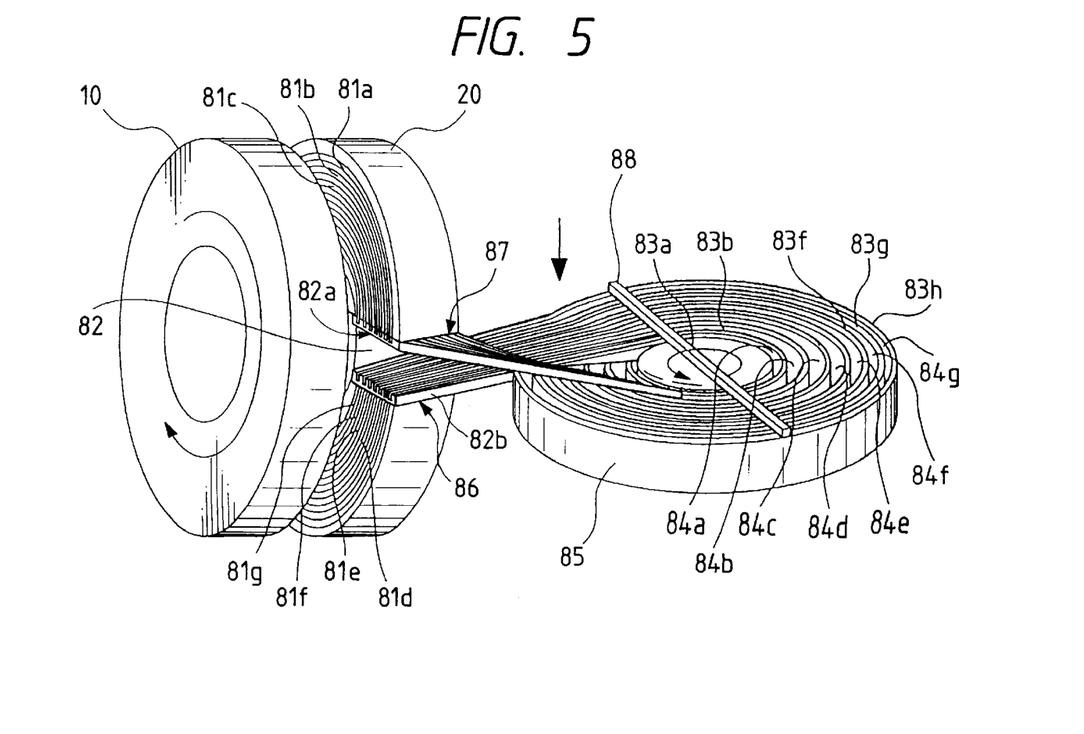
FIG. 5 is a perspective view showing an essential portion of the sphere polisher according to the second embodiment of the present invention.

A second embodiment of the sphere polisher according to the present invention will now be described with reference to FIG. 5. FIG. 5 is a perspective view showing an essential portion of the sphere polisher according to the second embodiment of the present invention.

Referring to FIG. 5, the rotative disc 10 arranged to be rotated is positioned coaxially with and opposite to the stationary fixed disc 20. Each of the rotative disc 10 and the fixed disc 20 has seven pairs of concentric annular grooves 81a, 81b, . . . , 81f and 81g (reference numerals are given from the outer portion of the fixed disc 20 toward the inner portion of the same in the radial direction) having cross sectional sizes which approximate the curvature radii of the steel balls 22 (not shown) required to be polished. The annular grooves 81a, 81b, . . . , 81f and 81g of the rotative disc 10 and the annular grooves 81a, 81b, . . . , 81f and 81g of the fixed disc 20 are formed opposite to one another so that each pair of the opposite annular grooves forms one polishing circuit for polishing the steel balls 22 (not shown).

The rotative disc 10 and the fixed disc 20 are operated similarly to those of the sphere polisher according to the first embodiment of the present invention.

The fixed disc 20 serves as a sector-shape cut portion 82. The cut portion 82 is defined by a side surface 82a of the fixed disc 20 in a direction opposite to the rotating direction and a side surface 82b of the fixed disc 20 in the rotating direction.

On the other hand, the rotative conveyor 85 serving as a storage conveyor has a partition plate 83a in the central portion thereof and seven partition plates 83b, 83c, . . . , 83h formed around the partition plate 83a. The partition plates are secured to a fixing plate 88 disposed across the rotative conveyor 85.

The partition plates 83a, 83b, 83c, . . . , 83h form seven independent annular chambers 84a, 84b, . . . , 84f and 84g for respectively accommodating steel balls 22 (not shown) included in one lot.

Between the fixed disc 20 and the rotative conveyor 85, there are formed an inlet chute portion 86 serving as a supply chute for supplying steel balls 22 in each annular chamber of the rotative conveyor 85 to each polishing circuit; and an outlet chute portion 87 serving as a discharge chute for returning the steel balls 22 polished in the polishing circuits into the annular chambers of the rotative conveyor 85.

The inlet chute portion 86 is connected to the side surface 82b of the cut portion 82 and provided with seven inlet chutes for connecting the annular chambers 84a, 84b, . . . , 84f and 84g to the corresponding polishing circuits (annular grooves 81a, 81b, . . . , 81f and 81g). The outlet chute portion 87 is connected to the side surface 82a of the cut portion 82 and provided with seven outlet chutes for connecting the annular grooves 81a, 81b, . . . , 81f and 81g to the corresponding annular chambers 84a, 84b, . . . , 84f and 84g.

The operation of the sphere polisher according to the second embodiment of the present invention will now be described.

When the rotative conveyor 85 has been operated, the steel balls are introduced from the annular chamber 84a of the rotative conveyor 85 into the polishing circuit (81a) through the inlet chute. The steel balls introduced into the polishing circuit (81a) are polished in the polishing circuit (81a) by rotating the rotative disc 10 while pressing the fixed disc 20 against the rotative disc 10 as described above. The polished steel balls are returned to the annular chamber 84a through the outlet chute. After the foregoing operation has been repeated plural times, the polishing operation is completed. As described above, the polishing circuit (81a), the annular chamber 84a, the inlet chute and the outlet chute form an independent circulation circuit. Also each of the other pairs of the polishing circuits (81b, ..., 81f and 81g) form an independent circulation circuit in association with the annular chambers 84b, ..., 84f and 84g. Since the same steel balls in the same circulation circuit therefore are always polished in the same polishing circuit, the lot diameter variation of the steel balls can be reduced.

Although the supply density of the steel balls to be polished in each independent circulation circuit is not limited in the present invention, it is preferable that the quantity of supply of the steel balls be previously determined for each of the circulation circuits corresponding to the inner and outer polishing circuits.

Although the rotative disc according to this embodiment is made of the grind stone, the rotative disc may be made of another material. Another polishing method may be employed in which the rotative disc is made of metal and free grind stone particles for polishing the steel balls are supplied into the polishing circuits.

A modification of the second embodiment of the sphere polisher according to the present invention may be employed in which plural conveyance passages for steel balls according to the second embodiment are unified into one of groups. As a result, the structure of the circular conveyor 85 can be simplified.

As described above, the sphere polisher according to the second embodiment of the present invention has the conveyance passages each of which is formed by combining the supply passage and the receiving passage formed at the same radial directional positions (addresses) in the fixed disc for independently conveying spheres. Therefore, one independent circulation circuit is formed by the polishing circuit, the supply passage and the receiving and conveyance flow passage. As a result, the same spheres in the same circulation circuit are always polished in the same polishing circuit so that the diameter variation of the spheres within the same circulation circuit is reduced.

Note that in this embodiment one lot is constituted by the spheres which are disposed in one circulation circuit. Namely, in this embodiment the spheres are simultaneously and respectively manufactured within different lots the numbers of which are coincided with that of the circulation circuits.

Figure 6:
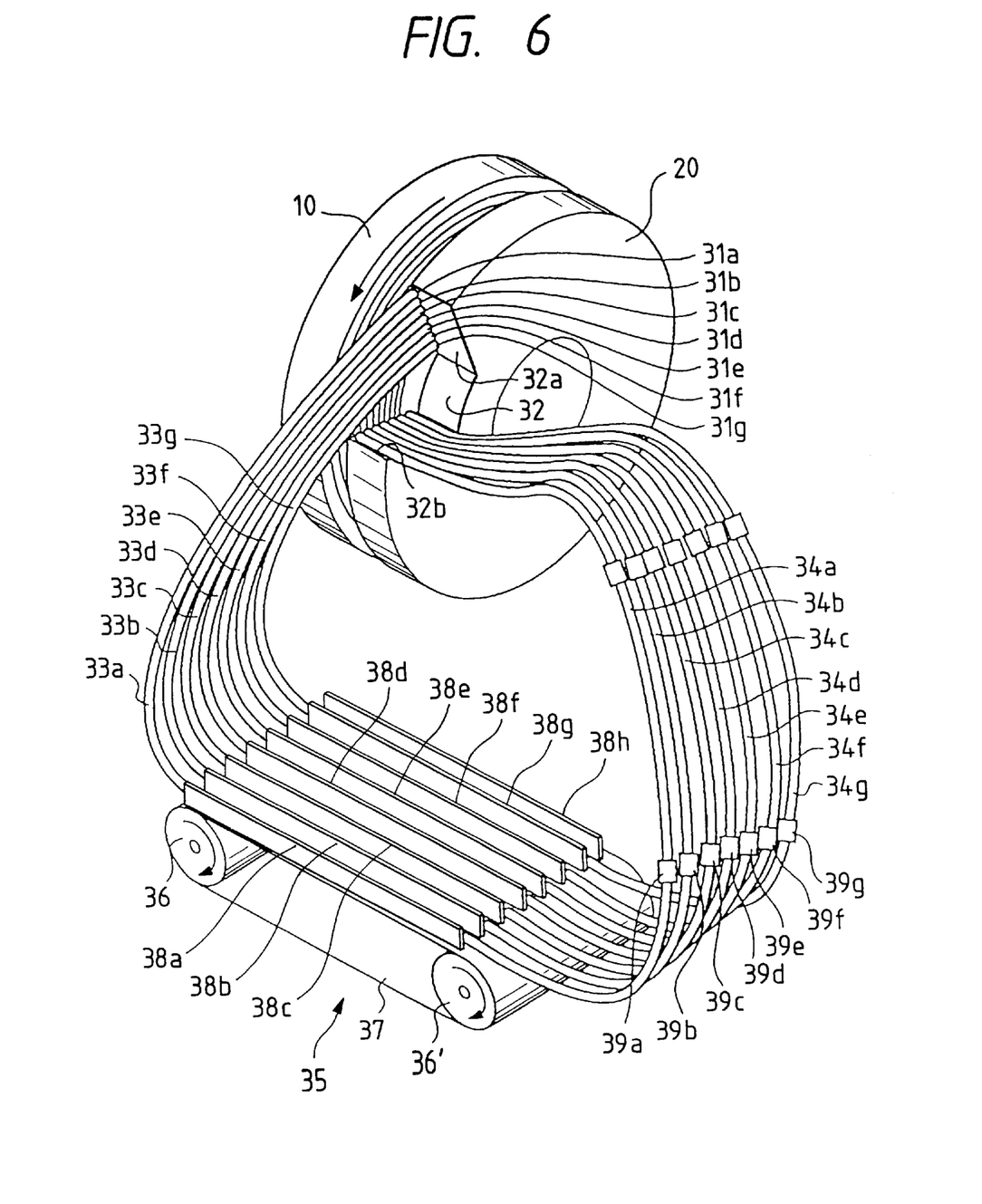
FIG. 6 is a perspective view showing an essential portion of the third embodiment of the sphere polisher according to the present invention.

A third embodiment of the sphere polisher according to the present invention will now be described with reference to FIG. 6. FIG. 6 is a perspective view showing an essential portion of the third embodiment of the sphere polisher according to the present invention.

Referring to FIG. 6, the rotative disc 10 arranged to be rotated is disposed coaxially with the stationary fixed disc 20. Each of the rotative disc 10 and the fixed disc 20 has seven pairs of coaxial annular grooves 31a, 31b, ..., 31f and 31g (reference numerals are given in a direction from the outer portion of the fixed disc 20 in the radial direction toward the inner portion) having cross sectional sizes approximating the curvature radii of the steel balls 22 required to be polished.

The annular grooves 31a, 31b, ..., 31f and 31g of the rotative disc 10 and the annular grooves 31a, 31b, ..., 31f and 31g of the fixed disc 20 are formed opposite to one another. A pair of opposite annular grooves form one polishing circuit for polishing the steel balls 22.

Since the rotative disc 10 and the fixed disc 20 are operated similarly to those of the conventional apparatus shown in FIG. 1, the operations are omitted from description.

The fixed disc 20 has a sector-shape cut portion 32. The cut portion 32 is defined by a side surface 32a and a side surface 32b of the fixed disc 20.

Ends of conveyance pipes 33a, 33b, ..., 33f and 33g are, on the side surface 32a, connected to corresponding annular grooves 31a, 31b, ..., 31f and 31g. Other ends of the conveyance pipes 33a, 33b, ..., 33f and 33g are connected to a belt conveyor 35 to be described later. On the side surface 32b, ends of conveyance pipes 34a, 34b, ..., 34f and 34g are connected to corresponding annular grooves 31a, 31b, ..., 31f and 31g. Other ends of the conveyance pipes 34a, 34b, ..., 34f and 34g are connected to a belt conveyor 35 to be described later. Each of the above-mentioned conveyance pipes has a cross sectional size near (larger than) the diameter of the steel balls 22.

Referring to FIG. 6, the structure of the belt conveyor 35 serving as the storage conveyor will now be described.

The belt conveyor 35 serves as the storage conveyor for absorbing and adjusting gain and delay in the movement of the steel balls 22 which are independently circulated in the supply conveyance pipes (34a to 34g) and receiving conveyance pipes (33a to 33g) and the polishing circuits without any mixture. Moreover, the belt conveyor 35 combine the supply conveyance pipes (34a to 34g) and receiving conveyance pipes (33a to 33g) for the steel balls 22 in such a manner that the radial directional positions (positions) of the foregoing conveyance pipes are the same.

The belt conveyor 35 is formed into a straight conveyor having a pair of upstream drum 36 and a downstream drum 36' disposed apart from each other in the horizontal direction and arranged to be rotated around horizontal rotational shafts; and the belt 37 arranged between the drums 36 and 36'. The belt 37 has an upper surface on which seven conveyance passages are formed which controls the straight flow of the steel balls 22. The conveyance passages are formed by eight partition plates 38a, 38b, ..., 38f, 38g and 38h disposed on the top surface of the belt 37, as shown in FIG. 6. FIG. 6 is a view of explanatory showing one conveyance passage for the steel balls 22 formed on the top surface of the belt 37 of the belt conveyor 35. Another end of the conveyance pipe 33a is, in the upstream portion of the belt 37, located above the conveyance passage formed by a pair of the partition plates 38a and 38b. Another end of the conveyance pipe 34a is, in the downstream portion of the belt 37, located above the conveyance passage formed by a pair of the partition plates 38a and 38b. Also another end of each of the conveyance pipes 33b, ..., 33f and 33g is, in the upstream portion of the belt 37, located above the conveyance passage formed by a pair formed by the partition plates 38b, ..., 38f, 38g and 38h. Also another end of each of the conveyance pipes 34b, ..., 34f and 34g is, in the downstream portion of the belt 37, located above the flow passage formed by the partition plates 38b, ..., 38f, 38g and 38h. As a result, sets of the steel balls 22 discharged from the other ends of the conveyance pipes 33a, 33b, ..., 33f and 33g are conveyed through the respective conveyance passages on the belt 37 of the belt conveyor 35 so as to be introduced into the other ends of the conveyance pipes 34a, 34b, ..., 34f and 34g.

On the other hand, the conveyance pipe 34a has, at positions near an end and another end thereof, an air feeder 39a for feeding air for conveying the steel balls 22 in the conveyance pipe 34a into the conveyance pipe 34a. Also the other conveyance passages 34b, . . . , 34f and 34g have air feeders 39b, . . . , 39f and 39g. Since the structure of the air feeder is a known fact, it is omitted from description.

Note that liquid feeders using oil or the like can be utilized instead of the air feeder 39a–g.

The operation of the third embodiment of the sphere polisher according to the present invention will now be described.

When the belt conveyor 35 has been operated, the steel balls 22 are conveyed from the downstream portion of the conveyance passage formed by the pair of the partition plates 38a and 38b of the belt conveyor 35 toward the conveyance pipe 34a. The steel balls 22 are conveyed by a proper conveying means to a position where the air feeder 39a is disposed, and the conveyance of the steel balls 22 in the conveyance pipe 34a is enhanced by compressed air supplied from the air feeder 39a. Then, the steel balls 22 are, from an end of the conveyance pipe 34a, introduced into a polishing circuit in the form of the annular groove 31a formed by the rotative disc 10 and the fixed disc 20. The steel balls 22 introduced into the polishing circuit 31a are polished in the polishing circuit 31a by rotating the rotative disc 10 while pressing the fixed disc 20 against the rotative disc 10. The steel balls 22 polished in the polishing circuit 31a are introduced into the conveyance pipe 33a through the end of the conveyance pipe 33a. As a result, the gravity causes the steel balls 22 to be conveyed into the conveyance passage formed by the pair of the partition plates 38a and 38b of the belt conveyor 35 through the upstream end of the conveyance passage. The above-mentioned operation is repeated plural times so that the polishing process is completed. As described above, the polishing circuit 31a, the pair of the partition plates 38a and 38b and the conveyance pipes 33a and 34a form one independent circulation circuit.

Also the polishing circuits 31b, . . . , 31f and 31g form the independent circulation circuits in association with the partition plates 38b, . . . , 38f, 38g and 38h. Therefore, the same steel balls 22 in the same circulation circuit are always polished in the same polishing circuit. Thus, the lot diameter variation of the spheres 22 within the same circulation circuit can be reduced.

Note that as one of examples of the proper conveying means for conveying the steel balls 22 from a position close to the downstream end of the partition plates 38a–h to a position where the air feeders 39a–g are disposed, a following construction is applicable. The conveying means is constituted by a combination of a plate having inclined surface and a pair of feeding rollers. The plate having inclined surface is mounted on the downstream end of the partition plates 38a–h and is provided with seven guiding grooves extended in parallel with one another for guiding the steel balls 22 to the relative conveyance pipes 34a–g. The pair of feeding rollers are disposed between the downstream edge portion of the inclined surface and the inlets of the conveyance pipes 34a–g. Both of the rotational axes of the pair of feeding rollers are extended in a horizontal direction. The pair of feeding rollers are rotated so as to feed the balls 22 interposed therebetween towards the inlet of the conveyance pipes 34a–g. Thereby, the balls 22 thus discharged from the inclined surface are clamped between the pair of feeding rollers and fed to the conveyance pipes 34a–g.

As described above, the sphere polisher according to the third embodiment of the present invention has the storage conveyor provided with the conveyance passage formed by combining the supply passage and the receiving passage having the same radial directional position (address) in the fixed disc so as to independently convey the spheres. Thus, the polishing circuit, the supply passage, the receiving passage and the conveyance passage form one independent circulation circuit. As a result, same spheres in the same circulation circuit are always polished by the same polishing circuit. Therefore, the diameter variation of the spheres within the same circulation circuit can be reduced.

Note that in this embodiment, one lot is constituted by the spheres within one circulation circuit. Namely, in this embodiment, the spheres belonging to seven different lots are simultaneously manufactured.

A modification of the supply chute 57 according to the first embodiment shown in FIG. 4 will now be described. Although this modification will be described about the modification of the supply chute 57, the foregoing structure may, of course, be applied to the second supply chute portion 57b and the supply chute 24 shown in FIG. 2.

Figure 7A:
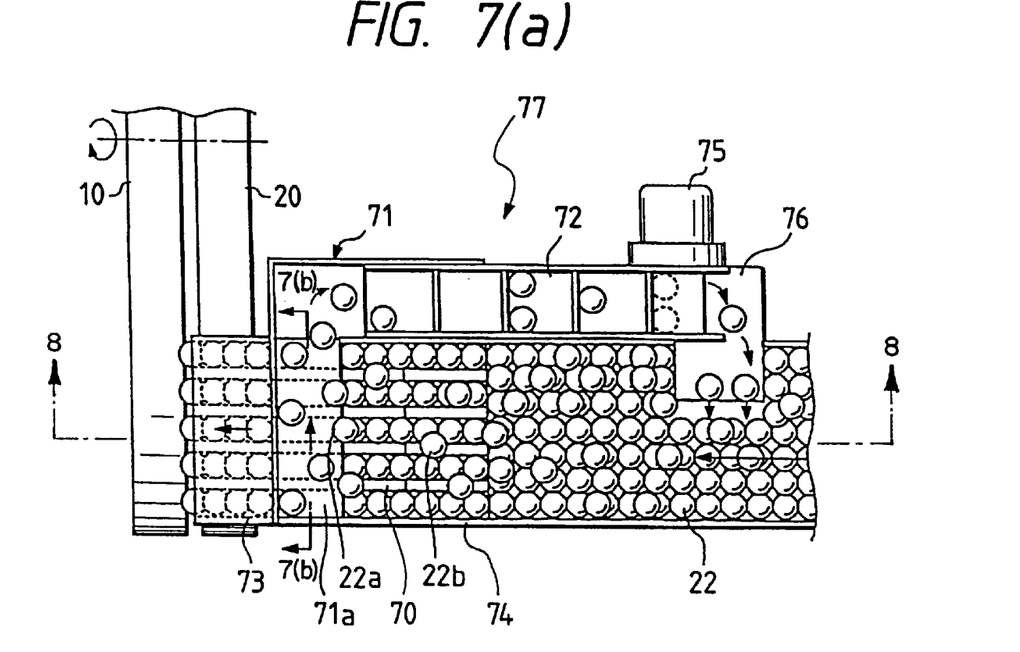
FIGS. 7(a) and 7(b) are a top view and a cross sectional view of an essential portion of the steel-ball supply unit according to the present invention.
Figure 7B:
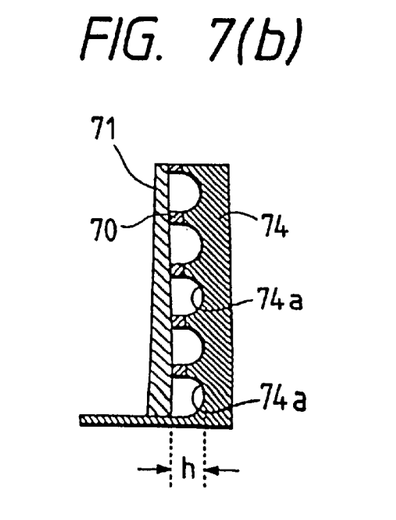
Figure 8:
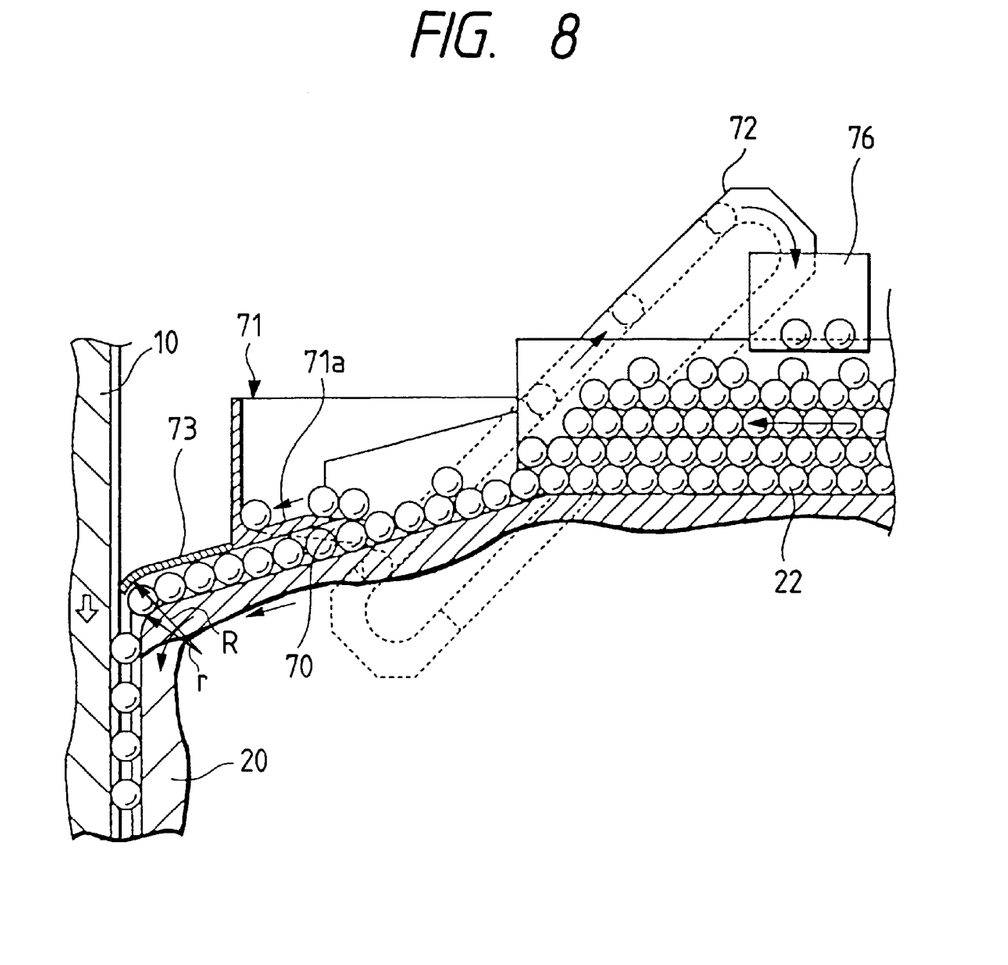
FIG. 8 is a cross sectional view of an inclined chute shown in FIG. 7(a).

FIGS. 7(a) and 7(b) are a top view and a cross sectional view of an essential portion of the steel-ball supply unit according to the present invention. FIG. 8 is a cross sectional view of an inclined chute shown in FIG. 7(a). In this modification, only the essential portion will be described and the same elements as those according to the first embodiment are described briefly or omitted from description.

The circular conveyor has, at an outlet portion thereof, an inclined chute 74 serving as a supply chute for introducing the steel balls 22 discharged from the outlet portion of the circular conveyor by using the dead weight and polishing solution. The inclined chute 74 has a concave cross sectional shape opened upwards provided with a bottom in which a plurality of guide grooves 74a for arranging the steel balls 22 at the inlet port of the polisher body and for introducing the steel balls 22 are formed, as shown in FIG. 7(b). A portion of the inclined chute 74 adjacent to the inlet port of the polisher body is bent into a circular arc shape formed by smoothly connecting the grooves of the fixed disc 20 and the guide grooves 74a of the fixed disc in the direction in which the steel balls 22 flow, the circular-arc bent portion having a curvature radius of r.

An upper plate 73 for covering the upper portion of the guide grooves 74a is provided for a portion of the inclined chute 74 adjacent to the inlet port of the polisher body. A portion of the upper plate 73 opposite to the bent portion of the inclined chute 74 is bent at a predetermined curvature radius R and the center of curvature of the same is the same as the curvature r of the inclined chute 74. It is preferable that the curvature radius R satisfies the following relational expression (1):

$$r+1.1D \leq R \leq r+1.2D \tag{1}$$

where r is the curvature of the inclined chute 74 and R is the curvature of the bent portion of the upper plate 73.

Note that the upper limit may somewhat be enlarged to be adaptable to the conditions including the degree of inclination of the inclined chute 74. Symbol D in the foregoing expression indicates the diameter of the steel ball 22.

The distance from the lower surface of the upper plate 73 to the bottom of the guide grooves 74a is made to be h, to be described later, by a jump block member 70 to be described later.

A biting preventive overflow mechanism for taking out the steel balls, for example, steel balls 22a and 22b, pushed to the outside of the guide grooves 74a is provided for the inclined chute 74 at a position between the upper plate 73 and the circular conveyor.

The biting preventive overflow mechanism consists of a plurality of jump block members 70 and a jump portion 71. Each jump block member 70 is formed by an elongated plate-like member extending along the guide grooves 74a. The elongated plate-like member is disposed between corresponding guide grooves 74a. An end of the jump block member 70 adjacent to the circular conveyor is tapered to be inclined in a direction along the guide grooves 74a.

The jump portion 71 is formed by a frame disposed above the inclined chute 74. A side portion of the frame facing the circular conveyor is opened to receive and discharge the steel balls pushed to the outside of the guide grooves 74a of the inclined chute 74. The jump portion 71 has jump plates 71a. An end of the jump plate 71a adjacent to the circular conveyor is tapered. The top surface of the jump plate 71a consist of a first inclined surface inclined toward one of the side portions of the inclined chute 74 in order to introduce the received steel balls into the inclined chute 74; and a second inclined surface inclined toward the circular conveyor in order to introduce the steel balls introduced along the first inclined surface to the circular conveyor. The lower surface of the jump plate 71a runs parallel to the guide grooves 74a as shown in FIG. 7(b). The distance h from the foregoing lower surface to the bottom of the guide groove 74a is defined to be larger than the diameter D of the steel ball 22 by the jump block member 70. It is preferable that the distance h be determined to satisfy the following relational expression (2):

$$1.1D \leq h < 1.2D \tag{2}$$

The steel balls 22 introduced along the second inclined surface of the jump plate 71a are returned to a position near the inlet portion of the inclined chute 74 by the return mechanism. The return mechanism is composed of a return conveyor 72 for conveying the steel balls 22 introduced along the second inclined surface of the jump plate 71a; and a return chute 76 for introducing the steel balls 22 conveyed by the return conveyor 72 to a position near the inlet portion of the inclined chute 74. The return conveyor 72 comprises, for example, a conveyor having a frame, for example, a chain conveyor which is rotated by a drive motor 75.

The supplying operation of the supply chute 77 will now be described.

Each steel ball 22 supplied from the circular conveyor to the inclined chute 74, is moved in the inclined chute 74 toward the inlet port of the polisher due to the dead weight and the polishing solution in such a manner that the steel balls are overlapped. A portion of the moving steel balls 22 is received by the guide grooves 74a so as to be moved along the guide grooves 74a. The other steel balls, for example, the steel balls 22a and 22b, overlapping a portion of the steel ball 22, are not received by the guide grooves 74a. Thus, the steel balls 22a and 22b are moved in a state where they are extruded to the outside of the guide grooves 74a.

For example, the steel balls 22a and 22b run onto the jump block member 70, and then run onto the jump plate 71a.

As an alternative to this, the steel balls 22a and 22b directly run onto the jump plate 71a. Specifically, the steel ball positioned between the guide grooves 74a, for example, the steel ball 22b, runs onto the jump plate 71a through the jump block member 70, as shown in FIG. 7(a). The movement of the steel ball for running onto the jump plate 71a can be performed smoothly and reliably because the end portion of the jump block member 70 adjacent to the circular conveyor and the end portion of the jump portion 71 adjacent to the circular conveyor are tapered. As a result, interruption of the smooth flow of the steel balls by the steel ball 22b can be prevented.

On the other hand, the steel ball, for example, the steel ball 22a, which moves while overlapping other steel balls 22 in the guide grooves 74a, directly runs onto the jump plate 71a, as shown in FIG. 8. Similarly to the steel ball 22b, the steel ball 22a is able to smoothly and reliably run onto the jump plate 71a because the end of the jump portion 71 adjacent to the circular conveyor is formed into the tapered shape and the distance from the bottom of the guide groove 74a to the lower surface of the jump plate 71a is determined to be h. Thus, interruption of the smooth flow the steel balls by the steel ball 22a can be prevented.

The steel ball which has run onto the jump plate 71a is introduced along the upper inclined surface of the jump plate 71a to the inlet port of the return conveyor 72. The return conveyor 72 conveys the steel ball into the return chute 76. The return chute 76 has an inclined surface toward the inclined chute 74 in order to introduce the steel balls 22 to the inclined chute 74. Thus, the steel ball conveyed into the return chute 76 are returned into the inclined chute 74 by the return chute 76.

The steel balls 22 received into the guide grooves 74a are moved in the guide grooves 74a. When the steel balls 22 have been introduced into respective introduction passages formed by the guide grooves 74a, the jump plate 71a and the jump block member 70, the steel balls 22 are aligned to form a line when moved. Thus, movement between the guide grooves 74a is prevented. The steel balls, allowed to pas through the respective introduction passages formed by the guide grooves 74a, the jump plate 71a and the jump block member 70, are introduced into respective introduction passages formed by the guide grooves 74a, the upper plate 73 and the jump block member 70 so as to be aligned for each introduction passage, and then introduced into the inlet portion of the polisher.

Since the distance h from the bottom of the guide groove 74a of each introduction passage to the lower surface of the 71a and the distance h from the bottom of the guide groove 74 to the lower surface of the upper plate 73 satisfy the foregoing Equation (2), in particular, since the value is set to be 1.1D or greater, any problem does not arise in the introduction passages such that the steel balls 22 cannot flow smoothly attributable to the influence of the viscosity of the polishing solution. Although the flow can easily be affected by the viscosity of the polishing solution if the diameter of the steel ball 22 is small, setting of the distance h to be 1.1D or greater is able to eliminate the adverse influence of the viscosity of the polishing solution.

As for the upper limit, a value somewhat greater than the value obtainable from the foregoing Equation (2) may be employed to be adaptable to the viscosity of the polishing solution and the degree of inclination of the inclined chute 74.

Since the portion of the inclined chute 74 opposite to the bent portion of the inclined chute 74 is bent with a predetermined curvature R, the steel balls 22 can be introduced into the inlet port of the polisher body such that the steel balls 22 are smoothly introduced between the rotative disc 10 and the fixed disc 20 of the polisher body. Thus, the steel balls 22 do not violently collide against the rotative disc 10 when the introduction of the steel balls 22 is performed. Since collision between the steel balls 22 and the rotative disc 10 can be moderated even if the steel balls 22 are introduced at high speed, the steel balls 22 can be protected from being damaged by the force of the collision.

Since the curvature R of the upper plate 73 opposite to the bent portion of the inclined chute 74 is set to satisfy the foregoing Equation (1), collision between the steel balls 22 and the rotative disc 10 can furthermore be moderated even if the steel balls 22 are introduced at high speed.

Since the steel balls 22 are aligned and introduced into the inlet port of the polisher by each guide groove 74*a*, the upper plate 73 and the jump block member 70, the steel balls are not bitten mutually.

As described above, the supply chute according to this modification enables the steel balls 22*a* and 22*b* which inhibit the smooth flow of the steel balls in the inclined chute 74 can temporarily be removed from the inclined chute 74 when the number of the steel balls which are supplied in unit time is enlarged by raising the rotational speed of the circular conveyor in order to shorten the time required to perform the polishing operation by the polisher. Therefore, the steel balls 22 are able to flow smoothly in the inclined chute 74 so that the number of the steel balls which can be supplied in unit time is enlarged. In the above-mentioned case in which each steel ball has a diameter of 1 mm and the weight of one lot is 100 Kg, twenty minutes have been required to cause the one lot to pass through the apparatus. The present invention is able to shorten the time to ten minutes. Thus, the time required to complete the polishing process can substantially be halved.

Since the steel balls 22 are aligned and then introduced into the inlet port of the polisher body, the steel balls can be protected from being damaged such that the steel balls are bitten mutually even if a large number of the steel balls are supplied in a short time.

As described above, the sphere polisher of the present invention comprises:

a non-rotative fixed disc having a plurality of first annular grooves formed concentrically around the axis of the fixed disc and at least one opening which is formed in the side surface of the fixed disc and which extends in the radial direction of the fixed disc;

a rotative disc made of a grind stone structured to rotate coaxially with and opposite to the fixed disc and having a plurality of second annular grooves formed concentrically with and opposite to the first annular grooves to form a plurality of polishing circuits;

sphere supply means having a first supply passage formed in the opening, connected to a group of the plural polishing circuits formed in an inner portion in the radial direction and structured to supply sphere members required to be polished to the group formed in the inner portion in the radial direction and a second supply passage formed in the opening, connected to a group of the plural polishing circuits formed in an outer portion in the radial direction and structured to supply the sphere members required to be polished to the group formed in the outer portion in the radial direction;

sphere discharge means having a first discharge passage formed in the opening, connected to the group of the plural polishing circuits formed in the inner portion in the radial direction and structured to discharge the spheres polished by the group formed in the inner portion in the radial direction, and a second discharge passage formed in the opening, connected to the group of the polishing circuits formed in the outer portion in the radial direction and structured to discharge the spheres polished by the group formed in the outer portion in the radial direction; and a storage conveyor disposed between the sphere supply means and the sphere discharge means, having a plurality of sphere conveying and guiding passages for conveying and guiding the spheres discharged from the sphere member discharge means to the sphere supplying means.

Therefore, the steel balls are allowed to separately or alternately pass through the plural polishing circuits sectioned into the group in the outer portion in the radial direction and the group in the inner portion in the radial direction so that the steel balls are polished under uniform conditions.

The foregoing description of preferred embodiments of the invention has been presented for purposes of illustration and description. It is not intended to be exhaustive or to limit the invention to the precise from disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A sphere polisher comprising:

a non-rotative fixed disc having a plurality of first annular grooves formed concentrically around an axis of said fixed disc and at least one opening which is formed in a side surface of said fixed disc and which extends in the radial direction of said fixed disc;

a rotative disc structured to rotate coaxially with and opposite to said fixed disc and having a plurality of second annular grooves formed concentrically with and opposite to said first annular grooves to form a plurality of polishing circuits;

sphere supply means having a first supply passage formed in said opening, connected to a group of said plural polishing circuits formed in an inner portion in the radial direction of said two discs and structured to supply sphere members required to be polished to the group formed in the inner portion in the radial direction of said two discs and a second supply passage formed in said opening, connected to a group of said plural polishing circuits formed in an outer portion in the radial direction of said two discs and structured to supply the sphere members required to be polished to the group formed in the outer portion in the radial direction of said two discs;

sphere discharge means having a first discharge passage formed in said opening, connected to the group of the plural polishing circuits formed in the inner portion in the radial direction of said two discs and structured to discharge the sphere members polished by the group formed in the inner portion in the radial direction of said two discs, and a second discharge passage formed in said opening, connected to the group of said plural polishing circuits formed in the outer portion in the radial direction of said two discs and structured to discharge the sphere members polished by the group formed in the outer portion in the radial direction of said two discs; and a storage conveyor disposed between said sphere supply means and said sphere discharge means, having a plurality of sphere conveying and guiding passages for conveying and guiding the sphere members discharged from said sphere discharge means to said sphere supply means.

2. A sphere polisher according to claim 1, wherein each of said sphere conveying and guiding passages has a first sphere conveying and guiding passage for conveying and guiding the sphere members discharged from said second discharge passage to said first supply passage and a second sphere conveying and guiding passage for conveying and guiding the sphere members discharged from said first discharge passage to said second supply passage.

3. A sphere polisher according to claim 1, wherein each of the sphere conveying and guiding passage has a first sphere conveying and guiding passage for conveying and guiding the sphere members discharged from said first discharge passage to said first supply passage and a second sphere conveying and guiding passage for conveying and guiding the sphere members discharged from said second discharge passage to said second supply passage.

4. A sphere polisher according to claim 3, wherein said first supply passage and said second supply passage of said sphere supply means are composed of a plurality of supply passages independently connected from said fixed disc for each polishing circuit and structured to supply the sphere members;

said first discharge passage and said second discharge passage of said sphere discharge means are composed of a plurality of discharge passages independently connected from said fixed disc for each polishing circuit and structured to discharge the sphere members; and said sphere guiding passage unifies the plural supply passages and the plural discharge passages to form an endless circulation passage for the sphere members which is formed independently for each polishing circuit.

5. A sphere polisher according to any one of claims 1 to 4, wherein said sphere supply means has an inclined chute having a guide groove structured to introduce the sphere members conveyed through said sphere guiding passage into said polishing circuit and formed such that an upper portion of said guide groove adjacent to said opening is closed with an upper plate, a biting preventive overflow mechanism for, at a position in an upstream portion of the upper plate of said inclined chute, taking out, from said inclined chute, the sphere members pushed outside from the guide groove and a return mechanism for returning the sphere members taken out from said inclined chute to said sphere guiding passage.

6. A sphere polisher according to claim 5, wherein said storage conveyor is formed by a stationary outer frame disposed in the outer periphery of a circular bottom individually from said circular bottom in order to form said sphere guiding passage in association with said circular bottom, and an inner guide surface of said outer frame is made of a low-friction slide member.

7. A sphere polisher according to any one of claims 1 to 4, wherein said storage conveyor is formed by a stationary outer frame disposed in the outer periphery of a circular bottom individually from said circular bottom in order to form said sphere guiding passage in association with said circular bottom, and an inner guide surface of said outer frame is made of a low-friction slide member.

8. A sphere polisher according to claim 1, wherein said storage conveyor is provided with a common drive source for conveying the sphere members within said plural sphere conveying and guiding passages.

* * * * *